United States Patent
Sun et al.

(10) Patent No.: US 10,647,912 B2
(45) Date of Patent: May 12, 2020

(54) CARBON-COATED VANADIUM DIOXIDE PARTICLES

(71) Applicant: SEKISUI CHEMICAL CO., LTD., Osaka (JP)

(72) Inventors: Ren-de Sun, Osaka (JP); Shoji Nozato, Osaka (JP); Akira Nakasuga, Osaka (JP); Masanori Nakamura, Kyoto (JP); Naoyuki Nagatani, Saitama (JP); Keigo Oowashi, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 247 days.

(21) Appl. No.: 15/465,766

(22) Filed: Mar. 22, 2017

(65) Prior Publication Data
US 2017/0190964 A1    Jul. 6, 2017

Related U.S. Application Data (63) Continuation of application No. PCT/JP2015/076722, filed on Sep. 18, 2015.

(30) Foreign Application Priority Data

Sep. 22, 2014    (JP) ................ 2014-192913

(51) Int. Cl.
*C09K 9/00*        (2006.01)
*C01G 31/02*      (2006.01)
(Continued)

(52) U.S. Cl.
CPC .............. *C09K 9/00* (2013.01); *B01J 13/02* (2013.01); *B32B 17/10036* (2013.01);
(Continued)

(58) Field of Classification Search
CPC ....................................................... C09K 9/00
(Continued)

(56) References Cited

U.S. PATENT DOCUMENTS

| | | | | |
|---|---|---|---|---|
| 6,162,532 A | * | 12/2000 | Black | B82Y 25/00 427/128 |
| 2005/0164090 A1 | * | 7/2005 | Kim | C01G 1/00 429/232 |

(Continued)

FOREIGN PATENT DOCUMENTS

| | | |
|---|---|---|
| CN | 100361328 C | 1/2008 |
| CN | 103554997 A | 2/2014 |

(Continued)

OTHER PUBLICATIONS

Zhang et al. "A novel route to fabricate belt-like VO2(M)@C core-shell structured composite and its phase transition properties", Materials Letters, 71, 2012, 127-130. published online Dec. 20, 2011 (Year: 2011).*

(Continued)

*Primary Examiner* — Jane L Stanley
(74) *Attorney, Agent, or Firm* — Osha Liang LLP (57) ABSTRACT

A carbon-coated vanadium dioxide particle includes a vanadium dioxide particle; and a coating layer containing amorphous carbon on a surface of the vanadium dioxide particle, the amorphous carbon being derived from carbon contained in an oxazine resin, and having a peak intensity ratio of a G band to a band of 1.5 or greater as determined from a Raman spectrum. The coating layer has an average thickness of 50 nm or less. The coating layer has a coefficient of variation (CV value) of thickness of 7% or less.

16 Claims, 5 Drawing Sheets

(51) Int. Cl.
*C09D 7/62* (2018.01)
*B01J 13/02* (2006.01)
*B32B 17/10* (2006.01)
*C03C 27/10* (2006.01)
*C08J 5/18* (2006.01)
*C08K 3/04* (2006.01)
*C08K 3/22* (2006.01)
*C08K 9/02* (2006.01)
*C09C 1/00* (2006.01)
*C09D 5/26* (2006.01)
*C09D 5/29* (2006.01)
*C09D 201/00* (2006.01)

(52) U.S. Cl.
CPC ......... *B32B 17/1055* (2013.01); *C01G 31/02* (2013.01); *C03C 27/10* (2013.01); *C08J 5/18* (2013.01); *C08K 3/04* (2013.01); *C08K 3/22* (2013.01); *C08K 9/02* (2013.01); *C09C 1/0006* (2013.01); *C09D 5/26* (2013.01); *C09D 5/29* (2013.01); *C09D 7/62* (2018.01); *C09D 201/00* (2013.01); *B32B 2264/107* (2013.01); *C01P 2002/02* (2013.01); *C01P 2004/04* (2013.01); *C01P 2004/80* (2013.01); *C01P 2006/32* (2013.01); *C01P 2006/60* (2013.01); *C08J 2300/22* (2013.01)

(58) Field of Classification Search
USPC ........................................................ 428/323
See application file for complete search history.

(56) References Cited

U.S. PATENT DOCUMENTS

| | | | |
|---|---|---|---|
| 2007/0048519 A1* | 3/2007 | Anderson | ............... B32B 17/10 428/323 |
| 2010/0202956 A1 | 8/2010 | Bogicevic | |
| 2011/0297899 A1* | 12/2011 | Tofuku | ................... B82Y 30/00 252/587 |
| 2012/0321953 A1* | 12/2012 | Chen | ..................... C01G 31/00 429/219 |
| 2014/0146382 A1 | 5/2014 | Cerny | |

FOREIGN PATENT DOCUMENTS

| | | |
|---|---|---|
| CN | 103773317 A | 5/2014 |
| JP | 2005216855 A | 8/2005 |
| JP | 2010528967 A | 8/2010 |
| JP | 2013075806 A | 4/2013 |
| JP | 2013184091 A | 9/2013 |

OTHER PUBLICATIONS

Zhang et al. "A novel route to fabricate belt-like VO2(M)@C core-shell structured composite and its phase transition properties", Materials Letters, 71, 2012, 127-130. published online Dec. 20, 2011, Supplemental Information (Year: 2011).*

Zhang et al. "Direct fabrication of organic carbon coated VO2(B) (VO2(B)@C) core-shell structured nanobelts by one step hydrothermal route and its formation mechanism", Applied Surface Scients, 263, 2012, 124-1331. Published online Sep. 12, 2012 (Year: 2012).*

Shi et al. "Design of Nanostructured Hybrid Materials Based on Carbon and Metal Oxides for Li Ion Batteries", J. Phys. Chem. C, 2012, 116, 26685-26693. published online Nov. 1, 2012 (Year: 2012).*

Yanfeng Gao et al.: "Enhanced chemical stability of VO2 nanoparticles by the formation of SiO2/VO2 core/shell structures and the application to transparent and flexible VO2-based composite foils with excellent thermochromic properties for solar heat control," XP055110298, Energy & Environmental Science, vol. 5, No. 3, pp. 6104-6110, Jan. 31, 2012 (7 pages).

Database WPI, XP002779591,Thomson Scientific, London, GB, Feb. 5, 2014 (2 pages).

Extended European Search Report issued in corresponding European application No. 15843182.5; dated Apr. 11, 2018 (6 pages).

* cited by examiner

CARBON-COATED VANADIUM DIOXIDE PARTICLES

TECHNICAL FIELD

One or more embodiments of the present invention relate to a carbon-coated vanadium dioxide particle which can suppress interparticle sintering during high-temperature firing, has high crystallinity and high durability, and may maintain its thermochromic properties even after long-term storage or use. One or more embodiments of the present invention also relate to a resin composition, a coating film, a film, an interlayer film for laminated glass, a laminated glass, and a film to be attached each obtained using the carbon-coated vanadium dioxide particle.

BACKGROUND

For its thermochromic properties, vanadium dioxide has been proposed for use as, for example, an automatic dimming material that automatically blocks infrared rays (heat rays) at high temperatures in summer while transmitting them at low temperatures in winter. Such an automatic dimming material, when applied to windows of automobiles or buildings, is expected to improve air conditioning efficiency by automatically adjusting the temperature inside the automobiles or the rooms. The automatic dimming material may be in the form of a thin film or film. For production of thin-film automatic dimming materials, dry film forming methods, such as sputtering, have been studied. However, as these methods require high cost and nave difficulty in forming a film having a large area, production methods including application or printing using fine particles have been proposed. For example, Patent Literature 1 discloses a method of forming a vanadium dioxide-dispersed resin layer by applying, on an appropriate substrate, a composition containing vanadium dioxide fine particles, a light-transmitting resin, and an organic solvent capable of dissolving the light-transmitting resin. A film of an automatic dimming material can be produced by, for example, dispersing vanadium dioxide fine particles in a resin, kneading them, and pressing or extrusion molding the kneaded product A laminated glass including two glass plates and the above film interposed therebetween can also be produced.

Patent Literature 2 discloses an interlayer film for laminated glass containing vanadium dioxide particles, and, the method for producing the same. Such an interlayer film for laminated glass containing vanadium dioxide fine particles dispersed therein is expected to highly transmit infrared rays below the phase transition temperature of vanadium dioxide and to block infrared rays above the phase transition temperature. However, such an inters ayes film for laminated glass containing vanadium dioxide particles dispersed therein shows a decrease in the thermochromic properties with time during storage or use, and thus has low durability.

Improvement in the properties of vanadium dioxide particles themselves has also been attempted to improve the thermochromic properties. It is known that vanadium dioxide particles with a smaller particle size have lower crystallinity. The thermochromic properties of vanadium dioxide particles greatly depend on their crystallinity, and usually vanadium dioxide particles with higher crystallinity tend to have better thermochromic properties. For improved transparency, nanoparticles with a particle size of 100 nm or smaller are required. Such a reduced particle size however, leads to significantly low thermochromic properties.

In order to overcome this, vanadium dioxide nanoparticles are fired at a high temperature to provide particles with high crystallinity. However, this method produces coarse particles composed of sintered particles, and fails to produce vanadium dioxide nanoparticles having a small particle size.

CITATION LIST

Patent Literature

Patent Literature 1: JP 2013-184091 A
Patent Literature 2: JP 2013-75806 A

SUMMARY

One or more embodiments of the present invention provide a carbon-coated vanadium dioxide particle which may suppress interparticle sintering during high-temperature firing, may have high crystallinity and high durability, and may maintain its thermochromic properties even after long-term storage or use. One or more embodiments of the present invention provide a resin composition, a coating film, a film, an interlayer film for laminated glass, a laminated glass, and a film to be attached each obtained using the carbon-coated vanadium dioxide particle.

One or more embodiments of the present invention relate to a carbon-coated vanadium dioxide particle, including: a vanadium dioxide particle; and a coating layer containing amorphous carbon on a surface of the vanadium dioxide particle, the amorphous carbon being derived from carbon contained in an oxazine resin, and having a peak intensity ratio of a G band to a D band of 1.5 or greater as determined from a Raman spectrum, the coating layer having an average thickness of 50 nm or less, the coating layer having a coefficient of variation (CV value) of thickness of 7% or less. In the following, one or more embodiments of the present invention will be described in detail.

The present inventors have discovered that a carbon coated vanadium dioxide particle having high crystallinity and high oxidation resistance and capable of maintaining its thermochromic properties even after long-term storage or use may be obtained by forming, on the surface of a vanadium dioxide particle, a coating layer which contains carbon derived from a predetermined resin and has predetermined physical properties.

The carbon-coated vanadium dioxide particle according to one or more embodiments of the present invention includes a vanadium dioxide particle and a coating layer containing amorphous carbon on the surface of the vanadium dioxide particle. The vanadium dioxide particle may have thermochromic properties. Vanadium dioxide constituting the vanadium dioxide particle is known to have various crystal structures, including A-type, B-type, and M-type crystal structures, and exhibits a phase transition behavior only when it has the rutile structure. Below the transition temperature, vanadium dioxide has a monoclinic structure and exhibits semiconductor characteristics. Above the transition temperature, the structure changes into a tetragonal structure, and the characteristics change into metal characteristics. Accordingly, the optical characteristics, electric characteristics, and heat characteristics reversibly change depending on temperature changes. Owing to this reversible change, vanadium dioxide offers advantages such as automatic dimming simply by a change in environmental temperatures.

The "vanadium dioxide particle" includes substituted vanadium dioxide particles in which part of the vanadium atoms is substituted with such an atom as tungsten, molybdenum, tantalum, niobium, chromium, iron, gallium, aluminum, fluorine, thallium, tin, rhenium, iridium, osmium, ruthenium, germanium, or phosphorous. The substituted vanadium dioxide constituting the substituted vanadium dioxide particles may have a structure represented by Formula (1) below, for example.

$$V_{1-x}M_xO_2 \qquad (1)$$

In Formula (1), is at least one element selected from the group consisting of tungsten, molybdenum, tantalum, niobium, chromium, iron, gallium, aluminum, fluorine, and phosphorus; and x represents a value of 0 to 0.05.

The phase transition temperature can be adjusted by, for example, substituting part of vanadium atoms in vanadium dioxide with such an atom as tungsten. Accordingly, the properties of the resulting product such as a film may be controlled by, for example, appropriately selecting vanadium dioxide particles or substituted vanadium dioxide particles, or appropriately selecting atomic species to substitute or the substitution rate for the substituted vanadium dioxide particles. In the case of using the substituted vanadium dioxide, the lower limit of the substitution rate of the metal atoms may be 0.1 at %, and the upper limit thereof may be 10 at %. When the substitution rate is 0.1 at % or more, the phase transition temperature of the substituted vanadium dioxide may be easily adjusted. When the substitution rate is 10 at % or less, improved thermochromic properties may be provided. The "substitution rate" as used herein means the proportion of the number of substitutional atoms to the total number of vanadium atoms and substitutional atoms, expressed in percentage.

The vanadium dioxide particle may be a particle consisting essentially only of vanadium dioxide, or may be a particle including a core particle with vanadium dioxide attached to the surface thereof. Similarly, the substituted vanadium dioxide particle may be a particle consisting essentially only of substituted vanadium dioxide, or may be a particle including a core particle with substituted vanadium dioxide attached to the surface thereof. Examples of the core particle include inorganic particles such as particles of silicon oxide, silica gel, titanium oxide, glass, zinc oxide, zinc hydroxide, aluminum oxide, aluminum hydroxide, titanium hydroxide, zirconium oxide, zirconium hydroxide, zirconium phosphate, hydrotalcite compounds, fired products of hydrotalcite compounds, and calcium carbonate.

The vanadium dioxide particle may have an average crystallite size of 1 to 100 nm. If the average crystallite size is less than 1 nm, the particle as a whole may have low crystallinity and thus is less likely to exhibit high thermochromic properties. If the average crystallite size is more than 100 nm, a thermochromic material prepared using the particle may have low transparency. The "crystallite size" as used herein means a crystallite size determined from the half value width of a diffraction peak obtained by an X-ray diffraction method. The crystallite size can be calculated by, for example, calculating the half value width from diffraction data obtained with an X-ray diffractometer (RINT1000, available from Rigaku Corporation) and applying the value to the Scherrer equation. Specifically, the crystallite size can be determined by using a crystallite size calculated from the half value width of the strongest peak (2θ=27.86°) of rutile $VO_2$. In the series of analyses, for example, the half value width and the crystallite size can be calculated using analysis software (PDXL, available from Rigaku Corporation).

In one or more embodiments, the vanadium dioxide particle may have a crystallinity of 90% or more. When the crystallinity is high, the proportion of crystals in the particle is large, leading to improved thermochromic properties. The crystallinity can be determined by, for example, an XRD analysis of a composition containing the particle and calculation using analysis software (PDXL, available from Rigaku Corporation).

Examples of the methods of preparing the vanadium dioxide particle include a hydrothermal synthesis method, a supercritical method, a complex decomposition method, a solid phase method, and a sol-gel method. Suitable among these methods are a hydrothermal synthesis method and a supercritical method because these methods are more likely to provide crystalline vanadium dioxide nanoparticles.

The carbon-coated vanadium dioxide particle according to one or more embodiments of the present invention may have a coating layer containing amorphous carbon. The presence of such a coating layer prevents interparticle sintering even after high-temperature firing, so that the vanadium dioxide nanoparticle may have improved crystallinity while maintaining its size. This leads to improved thermochromic properties, allowing both transparency and thermochromic properties to be achieved. The presence of such a coating layer also suppresses oxidation or reduction of the vanadium dioxide particle during use, thus improving the durability of the thermochromic material. In addition, such a carbon coating layer is more compatible with matrix resin than conventional oxide coating layers (e.g., $SiO_2, TiO_2$), so that the dispersibility of the particles in the resin is enhanced, leading to improved thermochromic properties of products.

The coating layer may be formed on at least part of the surface of the vanadium dioxide particle, or may be formed such that it covers the entire surface of the vanadium dioxide particle. In order to further suppress oxidation of the vanadium dioxide particle, the coating layer may be formed such that it covers the entire surface of the vanadium dioxide particle.

Figure 1:
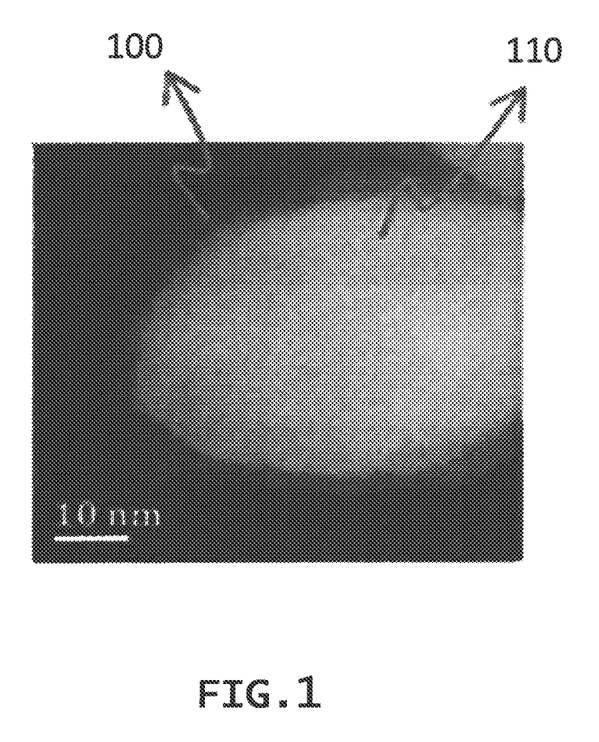
FIG. 1 is a transmission electron micrograph of a surface-coated particle according to one or more embodiments of the present invention.

In one or more embodiments, the coating layer may have high denseness. The present inventors have discovered that the following are two major factors causing a decrease (deterioration) in the thermochromic properties: oxidation of the vanadium dioxide particle due to oxygen; and reduction of the vanadium dioxide particle due to reducing substances (aldehydes) generated from resin such as polyvinyl butyral resin under ultraviolet irradiation. In one or more embodiments of the present invention, the formation of a coating layer with high denseness may prevent the vanadium dioxide particle from contacting oxygen or reducing substances, thereby suppressing oxidation or reduction of the particle. Regarding the dense coating layer, there is no clear definition of "denseness". However, "dense" as used herein is defined as follows: the coating layer (100) on the particle surface is clearly observed and also continuously formed as shown in FIG. 1 when individual nanoparticles (110) are observed with a high resolution transmission electron microscope.

In one or more embodiments, the amorphous carbon constituting the coating layer has an amorphous structure with both sp2 and sp3 bonds, and is made of carbon. The amorphous carbon has a peak intensity ratio of the G band to the 0 band of 1.5 or greater as determined from a Raman spectrum. When the amorphous carbon is analyzed by Raman spectroscopy, two peaks are clearly observed: the G band (around 1580 cm$^{-1}$) corresponding to the sp2 bond and the band (around 1360 cm$^{-1}$) corresponding to the sp3 bond. As for crystalline carbon materials, either one of the two bands is minimized. For example, monocrystalline diamond hardly shows the G band around 1560 cm$^{-1}$, whereas high-purity graphite structure hardly shows the D band around 1360 cm$^{-1}$. In one or more embodiments of the present invention, the peak intensity ratio of the G band to the D band (peak intensity of G band/peak intensity of D band) of 1.5 or greater allows the formed amorphous carbon film to have high denseness and improved suppress interparticle sintering at high temperatures. If the peak intensity ratio is less than 1.5, the film not only has insufficient denseness and insufficient sintering suppression effect at high temperatures, but also exhibits low adhesiveness and low film strength. In one or more embodiments, the peak intensity ratio may be 1.7 or greater. In yet another embodiment, the peak intensity may be 10 or lower. The coating layer may contain an element other than carbon, such as nitrogen, hydrogen, or oxygen. The amount of such an element may be 10 at % or less relative to the total amount of carbon and the element other than carbon.

In one or more embodiments, the amorphous carbon constituting the coating layer is derived from carbon contained in an oxazine resin. Use of the oxazine resin enables cost reduction because it can be carbonized at low temperatures. Oxazine which is commonly classified as a phenol resin, is a thermosetting resin obtainable by reacting a phenol and formaldehyde together with an amine. When the phenol is one containing an amino group attached to the phenol ring, such as para-aminophenol, no amine needs to be added in the reaction, and the resulting resin in such a case tends to be easily carbonized. Use of a naphthalene ring instead of a benzene ring makes carbonization easier.

Examples of The oxazine resin include a benzoxazine resin and a naphthoxazine resin. Suitable among these resins is a naphthoxazine resin because it is the easiest to carbonize at low temperatures. Partial structures of oxazine resins are shown below. A partial structure of a benzoxazine resin is shown in Formula (1), and that of a naphthoxazine resin is shown in Formula (2). As shown in the formulae, oxazine resins refer to resins containing a 6-membered ring attached to a benzene or naphthalene ring. The 6-membered ring contains oxygen and nitrogen, which is the origin of the name.

Use of an oxazine resin enables the formation of the amorphous carbon film at a much lower temperature than is possible with other resins such as epoxy resins. Specifically, oxazine resins can be carbonized at 200° C. or lower. In particular, a naphthoxazine resin can be carbonized at a lower temperature, By such carbonization at a lower temperature using an oxazine resin, a coating layer containing amorphous carbon and having high denseness may be formed. Why the coating layer containing amorphous carbon and having high denseness can be formed is unclear; however, without being bound by the theory, the inventors of the present disclosure believe for example, that when a naphthalene oxazine resin is used as the oxazine resin, the naphthalene structures in the resin are locally joined by low-temperature heating, and thus form a layer structure on the molecular level. Since high-temperature treatment is not performed, this layer structure, does not develop into a long-range periodic structure as graphite, and thus does not exhibit crystallinity. Whether the obtained carbon has a graphite structure or an amorphous structure can be determined by whether a peak is detected at a position where 2θ is 26.4° by an X-ray diffraction method (described later).

The raw materials for the naphthoxazine resin include dihydroxynaphthalene that is a phenol, formaldehyde, and an amine. These raw materials are described later.

The amorphous carbon may be obtained by heat treatment of the oxazine resin at 150° C. to 350° C. In one or more embodiments of the present invention, the use of a naphthoxazine resin, which can be carbonized at low temperatures, enables production of the amorphous carbon at a relatively low temperature. Such production of the amorphous carbon at a low temperature offers advantages such as lower cost and a simpler process than before. In one or more embodiments, the heat treatment temperature may range from about 170° C. to about 300° C.

In one or more embodiments, the upper limit of the average thickness of the coating layer is 50 nm. If the average thickness of the coating layer is more than 50 nm, the coated particle may be large, and thermochromic materials prepared using such a particle may have low transparency. The upper limit may be 30 nm. The lower limit is not limited, but may be 0.5 nm.

The coefficient of variation (CV value) of the thickness of the coating layer, may be 7% or less. When the CV value of the thickness of the coating layer is 7% or less, the coating film is uniform with less variation of the thickness, and thus has high barrier properties against oxygen and moisture. As a result, the presence of the coating layer contributes not only to prevention of sintering of vanadium dioxide nanoparticles during firing but also to improvement in oxidation resistance and water resistance of the carbon-coated vanadium dioxide particle, thereby leading to long-term stability of the thermochromic properties. In one or more embodiments, the upper limit of the CV value of the thickness of the coating layer may be 5%. In yet another embodiment, the lower limit thereof is not limited, but may be 0.5%. The CV value (%) of the thickness is the value obtained by dividing the standard deviation by the average thickness, expressed in percentage. The value can be obtained by the formula below. A smaller CV value indicates a smaller variation of the thickness, CV value (%) of thickness=(standard deviation of thickness/average thickness)×100

The average thickness and the standard deviation may be measured with a FE-TEM, for example.

The coating layer may have good adhesiveness to the vanadium dioxide particle. Although there is no clear definition of "adhesiveness", the coating layer may not peeled off even when a mixture containing the carbon coated vanadium dioxide particle, resin, a plasticizer, and a dispersing agent is treated with a bead mill.

Figure 5:
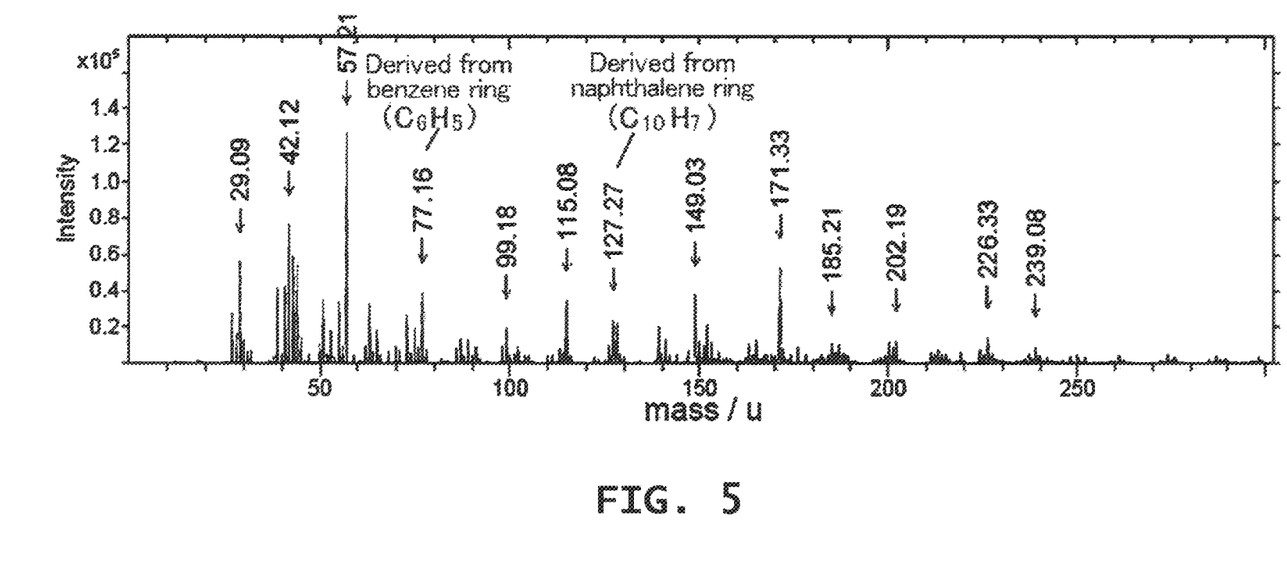
FIG. 5 is an example of results of analysis by TOF-SIMS according to one or more embodiments of the present invention.

In one or more embodiments of the present invention, at least one of a mass spectrum derived from a benzene ring and a mass spectrum derived from a naphthalene ring may be detected when the coating layer is analyzed by time-offlight secondary ion mass spectrometry (TOF-SIMS). When at least one of such a mass spectrum derived from a benzene ring and a mass spectrum derived from a naphthalene ring is detected, the coating layer can be confirmed to be derived from carbon contained in an oxazine resin, and at the same time, the coating film may have high denseness. The "mass spectrum derived tram a benzene ring" as used herein refers to a mass spectrum around 77.12. The "mass spectrum derived from a naphthalene ring" as used herein refers to a mass spectrum around 127.27. FIG. 5 shows an example of results of TOF-SIMS analysis. FIG. 5 shows a mass spectrum derived from a benzene ring at 77.16, and a mass spectrum derived from a naphthalene ring at 127.27. The above analysis can be performed with a TOF-SIMS instrument (available from ION-TOF), for example.

According to one or more embodiments of the present invention, no peak is detected at a position where 2θ is 26.4° when the coating layer is analyzed by an X-ray diffraction method. The peak at the position where 2θ is 26.4° is a peak of graphite crystal. When no peak is detected at this position, the carbon constituting the coating layer may be confirmed to have an amorphous structure. The above analysis can be performed with an X-ray diffractometer (SmartLab Multipurpose, available from Rigaku Corporation), for example.

The carbon-coated vanadium dioxide particle according to one or more embodiments of the present invention may be produced by a method including steps of: preparing a mixed solution containing formaldehyde, an aliphatic amine, and dihydroxynaphthalene; adding vanadium dioxide particles to the mixed solution and allowing the reaction therebetween to take place; and performing a heat treatment at 150° C. to 350° C.

The method of producing the carbon-coated vanadium dioxide particle according to one or more embodiments of the present invention includes the step of preparing a mixed solution containing formaldehyde, an aliphatic amine, and dihydroxynaphthalene. Since formaldehyde is unstable, formalin, a formaldehyde solution, may be used. Formalin usually contains a small amount of methanol as a stabilizer in addition to formaldehyde and water. The formaldehyde used in one or more embodiments of the present invention may be in the form of formalin as long as the formaldehyde content therein is clear. Paraformaldehyde, which is a polymerized form of formaldehyde, is also usable as a raw material. However, paraformaldehyde has lower reactivity, and thus formalin mentioned above may be used instead.

In one or more embodiments, the aliphatic amine may be represented by the formula R—$NH_2$ where R may be an alkyl group containing five or less carbon atoms. Examples of the alkyl group containing five or less carbon atoms include, but not limited to, methyl, ethyl, n-propyl, isopropyl, cyclopropyl, n-butyl, isobutyl, s-butyl, t-butyl, cyclobutyl, cyclopropylmethyl, n-pentyl, cyclopentyl, cyclopropylethyl, and cyclobutylmethyl. The substituent R is may be selected from the group of methyl, ethyl, propyl, or the like because the molecular weight of the aliphatic amine is small. In one or more embodiments, the actual compounds may include methylamine, ethylamine, and propylamine. In yet another embodiment, the compound used is methylamine, which has the smallest molecular weight.

The dihydroxynaphthalene has many isomers. Examples thereof include 1,3-dihydroxynaphthalene, 1,5-dihydroxynaphthalene, 1,6-dihydroxynaphthalene, 1,7-dihydroxynaphthalene, 2,3-dihydroxynaphthalene, 2,6-dihydroxynaphthalene, and 2,7-dihydroxynaphthalene. Among these isomers, 1,5-dihydroxynaphthalene and 2,6-dihydroxynaphthalene may be used because of their high reactivity. In various embodiments, 1,5-dihydroxynaphthalene, which has the highest reactivity, may be used.

Regarding the ratio between the three components in the mixed solution, namely dihydroxyhaphthalene, an aliphatic amine, and formaldehyde, may be used, where the amount of the aliphatic amine is 1 mol and the amount of the formaldehyde is 2 mol relative to 1 mol of dihydroxynaphthalene. The optimal mixing ratio is not always exactly the above ratio because under some reaction conditions, raw materials may be lost by, for example, volatilization during reaction; however, in various embodiments the amount of the aliphatic amine is within the range of 0.8 to 1.2 mol and the amount of formaldehyde is within the range of 1.6 to 2.4 mol relative to 1 mol of dihydroxynaphthalene.

When the amount of the aliphatic amine is 0.8 mol or more, an oxazine ring can sufficiently be formed and thus the polymerization suitably proceeds. When the amount of the aliphatic amine is 1.2 mol or less, formaldehyde required for the reaction is not consumed too much, and thus the reaction smoothly proceeds to provide desired naphthoxazine. Similarly, when the amount of the formaldehyde is 1.6 mol or more, an oxazine ring can sufficiently be formed, and thus the polymerization suitably proceeds. When the amount of the formaldehyde is 2.4 mol or less, side reactions may advantageously be reduced.

The mixed solution may contain a solvent for dissolution and reaction of the three raw materials. The solvent may be one commonly used for dissolving resin. Examples of such a solvent include alcohols such as methanol, ethanol, and isopropanol, tetranydrofuran, dioxane, dimethylformamide, dimethylacetamide, dimethylsulfoxide, and N-methylpyrrolidone. The amount of the solvent in the mixed solution is not limited, but usually 300 to 20000 parts by mass based on 100 parts by mass of raw materials including dihydroxynaphthalene, an aliphatic amine, and formaldehyde. When the amount is 300 parts by mass or more, the solvent may sufficiently dissolve the solutes, so that a uniform film may be obtained in film formation. When the amount is 20000 parts by mass or less, a concentration required for the formation of the coating layer may be ensured.

The method of producing the carbon-coated vanadium dioxide particle according to one or more embodiments of the present invention may include the step of adding vanadium dioxide particles to the mixed solution and allowing the reaction therebetween to take place. Proceeding of the reaction leads to formation of a layer containing naphthoxazine resin on the surface of the vanadium dioxide particles. Although the reaction proceeds at room temperature, warming to 40° C. or higher may be used to reduce the reaction time. Continuous warming causes opening of the produced oxazine ring, and when polymerization occurs, the molecular weight increases, so that a so-called polynaphthoxazine resin is obtained. Note that if the reaction excessively proceeds, the viscosity of the solution becomes too high to suit coating.

In one embodiment, a mixed solution of formaldehyde, an aliphatic amine, and dihydroxynaphthalene may be reacted for a certain period of time, and then vanadium dioxide particles may be added thereto. For uniform coating of the particles, the particles may be in a dispersed state at the time of the coating reaction. The particles can dispersed by a known method, such as stirring, sonication, or rotating. An appropriate dispersing agent can be added so as to improve the dispersing state. After the reaction step, the solvent may be dried and removed with, for example, hot air so that the surface of vanadium dioxide particles can be uniformly coated with the resin. Any heating and drying method can be used.

The method of producing the carbon-coated vanadium dioxide particle according to one or more embodiments of the present invention subsequently includes the step of performing a heat treatment at 150° C. to 350° C. In this step, the coating resin obtained in the preceding step is carbonized to provide a coating layer containing amorphous carbon.

In one or more embodiments, the heat treatment can be performed by any method. For example, a heating oven or an electric furnace may be used. The temperature in the heat treatment is 150° C. to 350° C. Since a naphthoxazine resin, which can be carbonized at low temperatures, is used in one or more embodiments of the present invention, the amorphous carbon can be obtained at a lower temperature. The upper limit of the heating temperature in this case may be 250° C. The heating treatment may be performed in the air or in inert gas such as nitrogen or argon. In the case that the heat treatment temperature is 250° C. or higher, an inert gas atmosphere may be used.

By using a resin composition containing the carbon-coated vanadium dioxide particle according to one or more embodiments of the present invention and a thermosetting resin, a coating film and a film to be attached having thermochromic properties may be obtained. The resin composition, the coating film, and the film to be attached are also encompassed by the present disclosure. Applying the resin composition to glass for a window provides a windowpane having automatic dimming properties. Attaching the film to be attached to a windowpane may also provide automatic dimming properties thereto. A film containing the carbon-coated vanadium dioxide particle according to one or more embodiments of the present invention and a thermoplastic resin exhibits improved thermochromic properties. Such a film is also encompassed by the present disclosure.

The film according to one or more embodiments of the present invention, which has such improved thermochromic properties, may be used as an interlayer film for laminated glass. Such an interlayer film for laminated glass including the film as described herein is also encompassed by the present disclosure.

A laminated glass including two transparent plates and the interlayer film for laminated glass according to one or more embodiments of the present invention interposed therebetween is also encompassed by the present disclosure. As disclosed herein, the laminated glass according to one or more embodiments of the present invention may be produced by any method. Any conventionally known production method may be used.

The transparent plates are not limited. Commonly used transparent plate glass can be used. Examples thereof include organic glass such as float plate glass, polished plate glass, molded plate glass, wired glass, wire reinforced plate glass, colored plate glass, heat ray-absorbing plate glass, heat ray reflecting plate glass, and green glass. Organic plastic plates such as polycarbonate plates and polyacrylate plates can also be used.

The two transparent plates may be of the same type or different types. Examples of combinations of two transparent plates of different types include: a transparent float plate class with a colored plate glass such as green glass; and an inorganic glass with an organic plastic plate.

The film according to one or more embodiments of the present invention can also be used as a film to be attached. The film to be attached including the thermochromic film as described herein is also encompassed by the present disclosure. The film to be attached may further include an adhesive layer. The adhesive layer is not limited, and may be a layer containing a known adhesive capable of bonding the film to be attached to a windowpane or the like.

One or more embodiments of the present invention provide a carbon-coated vanadium dioxide particle which can suppress interparticle sintering during high-temperature firing, has high crystallinity and high durability, and may maintain its thermochromic properties even after long-term storage or use. One or more embodiments of the present invention also provides a resin composition, a coating film, a film, an interlayer film for laminated glass, a laminated glass, and a film to be attached each obtained using the carbon-coated vanadium dioxide particle.

DETAILED DESCRIPTION OF EMBODIMENTS

One or more embodiments of the present invention will be described below with reference to examples. The present invention is not limited to these examples.

Example 1

(Preparation of Vanadium Dioxide Particles)

To 50 mL of an aqueous dispersion containing 1.299 g of ammonium metavanadate ($NH_4VO_3$) was slowly added dropwise of a 10% aqueous hydrazine solution, and the mixture was reacted at room temperature for one hour. Thereafter, the reaction mixture was transferred into a stainless steel-made pressure-resistant vessel equipped with a fluororesin inner tube, and then reacted at 270° C. for 48 hours. After the reaction, the particles were separated from the solution by centrifugation and washed three times. The particles were then recovered by drying at 50° C. The particle size (volume average particle size) of the obtained vanadium dioxide particles was measured using a particle size distribution analyzer (Microtrac UAM-1, available from Nikkiso Co., Ltd.).

(Formation of Coating Layer)

In sequence, 0.1 g of 1,5-dihydroxynaphthalene (available from Tokyo Chemical Industry Co. Ltd.), 0.05 g of 40% methylamine (available from Wako Pure Chemical industries, Ltd.), and 0.1 g of a 37% aqueous formaldehyde solution (available from Wako Pure Chemical Industries, Ltd.) were dissolved into ethanol. Thus, 20 g of a mixed solution in ethanol was prepared. Subsequently, 0.2 g of the vanadium dioxide particles were added to the obtained mixed solution, and the resulting mixture was treated in an ultrasonic tank for four hours. The solution was filtrated, followed by washing of the particles three times with ethanol, and further followed by vacuum-drying of the particles at 50° C. for three hours. The drier particles were then heated at 150° C. for two hours, whereby carbon-coated vanadium dioxide particles were obtained.

The surface of the vanadium dioxide particles before the heating at 150° C. for two hours was subjected to nuclear magnetic resonance spectroscopy (NMR spectroscopy). A peak (3.95 ppm) corresponding to the methylene group of "benzene ring-$CH_2$—N" and a peak (4.92 ppm) corresponding to the methylene group of "O—$CH_2$—N" of a naphthoxazine ring were detected at almost the same intensity. This confirmed that a resin component containing a naphthoxazine ring was deposited on the surface of the particles. The nuclear magnetic resonance spectroscopy was performed with $^1$H-NMR 600 MHz) available from Varian Inova using deuterated dimethyl sulfoxide. The number of spectral accumulations was 256, and the relaxation time was 10 seconds.

The obtained carbon-coated vanadium dioxide particles were analyzed by Raman spectroscopy using Almega XR (available from Thermo Fisher Scientific K.K.). Peaks were observed at both the G band and the D band, indicating that the naphthoxazine ream was converted into amorphous carbon. The peak intensity ratio of the G band to the D band was 1.72. The laser light was at 530 nm.

Example 2

Carbon-coated vanadium dioxide particles were obtained in the same manner as in Example 1, except that vanadium dioxide particles were prepared by the method described below. The "heating at 150° C. for two hours" in "(Formation of coating layer)" of Example 1 was changed to "heating at 200° C. for two hours".
(Preparation of Vanadium Dioxide Particles)

To 50 mL of an aqueous dispersion containing 1.299 g of ammonium metavanadate ($NH_4VO_3$) and 0.0329 g of ammonium tungstate hydrate (($NH_4)_{10}W_{12}O_{41} \cdot 5H_2O$) was slowly added dropwise 4.5 mL of a 10% aqueous hydrazine solution. The mixture was reacted at room temperature for one hour. Thereafter, the reaction mixture was transferred into a stainless steel-made pressure-resistant vessel equipped with a fluororesin inner tube, and reacted at 270° C. for 48 hours. After the reaction, the particles were separated from the solution by centrifugation and washed three times. Then, vanadium dioxide particles were recovered by drying at 50° C. X-ray fluorescence analysis of the composition of the particles showed that the vanadium dioxide particles contained about 1 mol % of tungsten.

Example 3

Carbon-coated vanadium dioxide particles were obtained in the same manner as in Example 1, except that the vanadium dioxide particles obtained in Example 2 were used and that the coating layer was formed by the method described below.
(Formation of Coating Layer)

In sequence, 0.07 g of 1,5-dihydroxynaphthalene (available from Tokyo Chemical Industry Co., Ltd.), 0.03 g of 40% methylamine (available from Wako Pure Chemical industries, Ltd.), and 0.07 g of a 37% aqueous formaldehyde solution (available from Wake Pure Chemical Industries, Ltd.) were dissolved into ethanol. Thus, 20 g of a mixed solution in ethanol was prepared. Subsequently, 0.2 g of tungsten-doped vanadium dioxide particles were added to the obtained mixed solution, and the resulting mixture was treated in an ultrasonic tank for six hours. The solution was filtrated, followed by washing of the particles three times with ethanol, and further followed by vacuum-drying of the particles at 50° C. for three hours. The dried particles were then heated at 150° C. for two hours, whereby carbon-coated vanadium dioxide particles were obtained.

FIG. 1 is a transmission electron micrograph of a surface-coated particle. A dense coating layer with a thickness of about 4 nm was observed on the surface. This coating layer was confirmed to be carbon by elemental analysis using an energy dispersive X-ray detector attached to the transmission electron microscope.

Example 4

Carbon-coated vanadium dioxide particles were obtained in the same manner as in Example 1, except that the vanadium dioxide particles obtained in Example 2 were used, and that the coating layer was formed by the method described below.
(Formation of Coating Layer)

In sequence, 0.5 g of 1,5-dihydroxynaphthalene (available from Tokyo Chemical Industry Co., Ltd.), 0.5 g of 40% methylamine (available from Wako Pure Chemical industries, Ltd.), and 0.25 g of a 37% aqueous formaldehyde solution (available from Wako Pure Chemical Industries, Ltd.) were dissolved into ethanol. Thus, 20 g of a mixed solution in ethanol was obtained. Subsequently, 0.2 g of tungsten-doped vanadium dioxide particles were added to the obtained mixed solution, and the resulting mixture was treated in an ultrasonic tank for three hours. The solution was filtrated, followed by washing of the particles three times with ethanol, and further followed by vacuum-drying of the particles at 50° C. for three hours. The dried particles were then heated at 300° C. for two hours, whereby carbon-coated vanadium dioxide particles were obtained.

Example 5

Carbon-coated vanadium dioxide particles were obtained in the same manner as in Example 1, except that the vanadium dioxide particles were prepared by the method described below.
(Preparation of Vanadium Dioxide Particles)

To 50 mL of an aqueous dispersion containing 1,209 g of ammonium metavanadate ($NH_4VO_3$) and 0.02 g of ammonium molybdate hydrate (($NH_4)_6Mo_7O_{24} \cdot 4H_2O$) was slowly added dropwise 4.5 mL of a 10% aqueous hydrazine solution. The mixture was reacted at room temperature for one hour. Thereafter, the reaction mixture was transferred into a stainless steel-made pressure-resistant vessel equipped with a fluororesin inner tube, and reacted at 270° C. for 48 hours. After the reaction, the particles were separated from the solution by centrifugation and washed three times. Then, vanadium dioxide particles were recovered by drying at 50° C. X-ray fluorescence analysis of the composition of the particles showed that the vanadium dioxide particles contained about 1 mol % of molybdenum.

Comparative Example 1

The vanadium dioxide particles prepared in Example 2 were used without "(Formation of coating layer)".

Comparative Example 2

A TiO$_2$ coating layer was formed by the method described below using the vanadium dioxide particles obtained in Example 2.
(Formation of Coating Layer)
Into a dispersion of 1.0 g of the vanadium dioxide particles at Example 2 in 100 mL of dehydrated ethanol was dissolved 3.0 g of titanium isopropoxide (available from Kanto Chemical Co., Inc.). Subsequently, 50 mL of a solution containing 2.5 g of water (with a pH adjusted to 9.0 with ammonia water) in ethanol was added dropwise to the dispersion at 0.5 mL/min. After the completion of the dropwise addition, the dispersion was reacted with stirring for another one hour. This was followed by filtration, and further followed by washing and drying steps. Thus, coated vanadium dioxide particles were obtained.

Comparative Example 3

Carbon-coated vanadium dioxide particles were obtained in the same manner as in Example 1, except that the vanadium dioxide particles obtained in Example 2 were used, and that the coating layer was formed by the method described below.
(Formation of Coating Layer)
To a solution of 1.5 g of glucose in 70 mL of water were added 0.5 g of the vanadium dioxide particles obtained in Example 2. The particles were dispersed by stirring. The dispersion was then transferred into a stainless-steel made pressure-resistant vessel equipped with a fluororesin inner tube, and heat-treated at 180° C. for eight hours. After the reaction, the dispersion was cooled to room temperature, followed by centrifugation, and further followed by washing. Thus, carbon-coated vanadium dioxide particles were obtained.

Comparative Example 4

Figure 2:
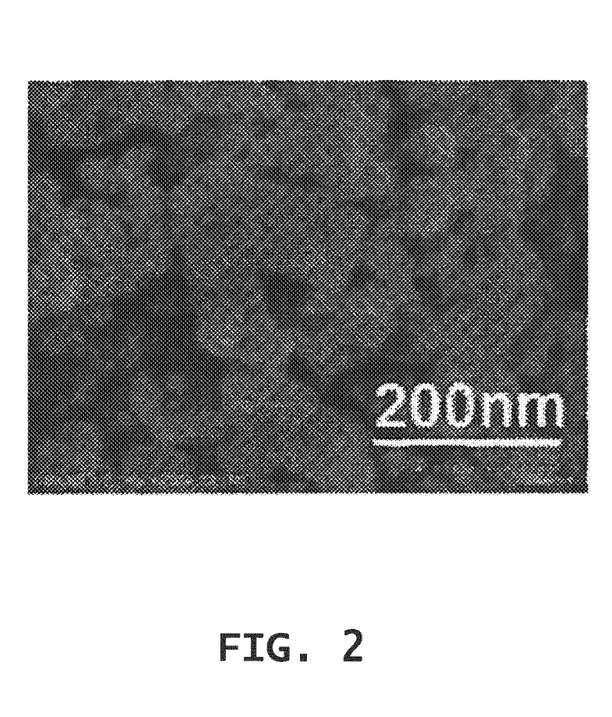
FIG. 2 is an electron micrograph of vanadium dioxide particles obtained in Example 3 before firing according to one or More embodiments of the present invention.
Figure 3:
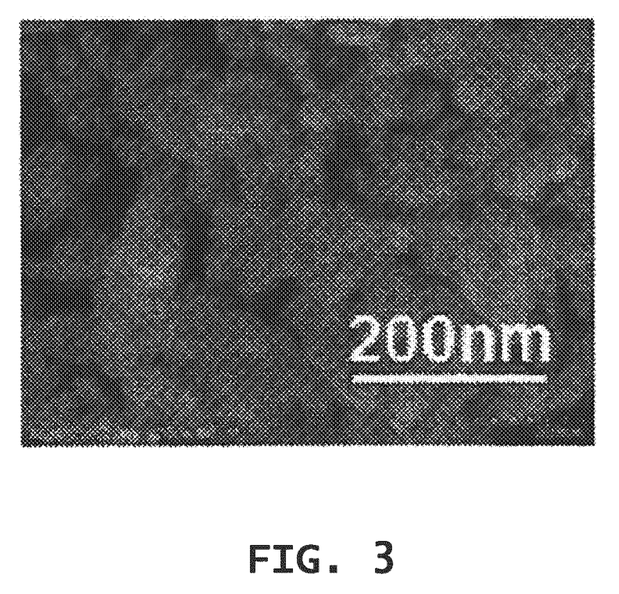
FIG. 3 is an electron micrograph of vanadium dioxide particles obtained in Example 3 after firing according to one or more embodiments of the present invention.
Figure 4:
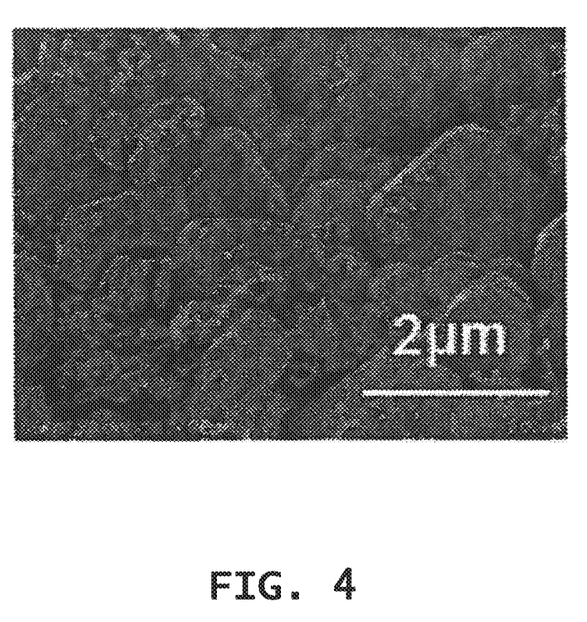
FIG. 4 is an electron micrograph of vanadium dioxide particles obtained in Comparative Example 1 after firing according to one or more embodiments of the present invention.

Carbon-coated vanadium dioxide particles were obtained in the same manner as in Example 2, except that the heat treatment after the coating treatment was performed at 135° C. for four hours.
(Evaluation)
(1) Measurement of Thickness (Average Thickness and CV Value) of Coating Layer
The average thickness and the CV value of the coating layer were evaluated using a transmission electron microscope (FE-TEM). Specifically, the cross-sections of the coating layers of randomly selected 20 particles were photographed with the FE-TEM. In the obtained cross-sectional photographs, the thickness of the coating layer was randomly measured at different 10 sites for each particle, and the average thickness and the standard deviation were calculated. The coefficient of variation of the thickness was calculated from the obtained values. Here, since the atomic weight of the coating carbon on the surface and that of the vanadium inside are greatly different, the thickness of the coating layer (carbon layer) can be estimated from the contrast in the TEM image.
(2) Average Particle Size
The average particle size of the particles obtained in the examples and the comparative examples was measured by analyzing FE-SEM images of the particles using image analyzing software (WINROOF, available from Mitani Corporation). The average particle size after firing at 800° C. for two hours was also measured. As for the vanadium dioxide particles obtained in Example 3, electron micrographs of the particles before firing (FIG. 2) and after firing (FIG. 3) were taken. Comparison of these micrographs showed almost no change in the size of the vanadium dioxide particles before and after the firing. In the case where no coating layer was formed (Comparative Example 1), the particles became coarser after firing (FIG. 4). This indicates that the formation of the coating layer prevents interparticle sintering at high temperatures.
(3) TOF-SIMS Analysis
For the coating layer of the obtained particles, whether a mass spectrum (around 77.12) derived from a benzene ring and a mass spectrum (around 127.27) derived from a naphthalene ring were present was determined by time-of-flight secondary ion mass spectrometry (TOF-SIMS) with TOF-SIMS 5 (available from ION-TOF). The TOF-SIMS was performed under the conditions below. In order to minimize contamination due to the air or the storage casing, the sample prepared was stored in a clean casing for silicon wafer storage.
Primary ion 209Bi+1
Ion voltage 25 kV
Ion current: 1 pA
Mass range 1 to 300 mass
Analysis area: 500×500 μm
Charge-up prevention: electron irradiation neutralization
Random raster scan
(4) X-Ray Diffraction
Analysis was performed using an X-ray diffractometer (SmartLab Multipurpose, available from Rigaku Corporation) under the following conditions.
X-ray wavelength: CuKα 1.54 A
Analysis range: 2θ=10° to 70°
Scanning rate: 4°/min
Step: 0.02°
For the obtained diffraction data, whether a peak was detected at a position of 2θ=26.4° was checked. The crystallite size was also determined by calculating the half value width from the obtained diffraction data and applying the value to the Scherrer equation. Specifically, the average crystallite size calculated from the half value width at 2θ=27.86° was used. The average crystallite size after firing at 800° C. for two hours was also determined. A series of analyses was performed using analysis software (PDXL2).
(5) Phase Transition Energy (Thermochromic Properties)
The heat absorption ΔH (mJ/mg) of the obtained particles at the time of phase transition was measured using a differential scanning calorimeter DSC ("DSC6220", available from SII NanoTechnology Inc.) at a temperature range of 0° C. to 100° C. and a temperature-increasing rate of 5° C./min under nitrogen atmosphere.
(6) Oxidation Resistance
The vanadium dioxide particles obtained in the examples and comparative examples were subjected to heat treatment in the air atmosphere at 300° C. for two hours. The oxidation resistance was evaluated based on the retention (%) of the phase transition energy of the particles after the heat treatment.
(7) Durability
The durability of the vanadium dioxide particles was evaluated by an accelerated weathering test of an interlayer film for laminated glass containing the particles. A film was formed by hot-pressing a resin composition containing the particles obtained in the corresponding example or the comparative example, vanadium dioxide particles, butyral resin, and a plasticizer (triethylene glycol di-2-ethylhexanoate). Each film was interposed between two glass plates using a vacuum laminator, whereby an interlayer film for laminated glass was prepared. The weight ratio of the butyral resin to the plasticizer in the film was 3:1, and the vanadium dioxide particle concentration in the film was 0.05%. The interlayer film for laminated glass was subjected to an accelerated weathering test for 500 hours using a weather meter (Super Xenon SX-75, available from Suga Test instruments Co., Ltd.) under the following conditions: radiation intensity: 180 W/m$^2$ (300 to 400 nm); temperature (BPT): 63° C.; water sprinkling: 18 min/120 min. The durability was evaluated based on the retention of the thermochromic properties of the film after the test.

TABLE 1

| | Vanadium dioxide particles | | Coating layer | | | | TOF-SIMS analysis | |
|---|---|---|---|---|---|---|---|---|
| | Structure | Average particle size (nm) | Material | Average thickness (nm) | CV value of thickness (%) | Peak intensity ratio | Benzene ring | Naphthalene ring |
| Example 1 | $VO_2$ | 40 | Amorphous carbon | 10 | 4.0 | 1.72 | Present | Present |
| Example 2 | $V_{0.99}W_{0.01}O_2$ | 35 | Amorphous carbon | 10 | 4.0 | 2.00 | Present | Present |
| Example 3 | $V_{0.99}W_{0.01}O_2$ | 35 | Amorphous carbon | 4 | 3.5 | 1.60 | Present | Present |
| Example 4 | $V_{0.99}W_{0.01}O_2$ | 35 | Amorphous carbon | 50 | 6.5 | 2.30 | Present | Present |
| Example 5 | $V_{0.99}Mo_{0.02}O_2$ | 30 | Amorphous carbon | 10 | 4.0 | 1.70 | Absent | Present |
| Comparative Example 1 | $V_{0.99}W_{0.01}O_2$ | 35 | — | — | — | — | Absent | Absent |
| Comparative Example 2 | $V_{0.99}W_{0.01}O_2$ | 35 | $TiO_2$ | 10 | 25 | — | Absent | Absent |
| Comparative Example 3 | $V_{0.99}W_{0.01}O_2$ | 35 | Amorphous carbon | 60 | 30 | G and D bands not detected | Absent | Absent |
| Comparative Example 4 | $V_{0.99}W_{0.01}O_2$ | 35 | Amorphous carbon | 15 | 8.5 | 1.3 | Present | Present |

| | Evaluation | | | | | | |
|---|---|---|---|---|---|---|---|
| | Coating layer X-ray diffraction | Average particle size (nm) | | Average crystallite size (Å) | | Phase transition energy (mJ/mg) | Oxidation resistance of particles (Phase transition energy retention (%)) | Durability of interlayer film (Thermochromic properties retention (%)) |
| | | Before firing | After firing | Before firing | After firing | | | |
| Example 1 | Absent | 60 | 58 | 4.0 | 24 | 19.8 | 92 | 90 |
| Example 2 | Absent | 55 | 56 | 3.2 | 20 | 12.4 | 95 | 98 |
| Example 3 | Absent | 43 | 45 | 3.2 | 25 | 12.0 | 88 | 85 |
| Example 4 | Absent | 135 | 130 | 5.5 | 30.0 | 12.1 | 93 | 92 |
| Example 5 | Absent | 50 | 52 | 10.6 | 44.0 | 9.5 | 95.0 | 94 |
| Comparative Example 1 | Absent | 35 | 800 | 3.2 | 65.0 | 35.6 | 25.0 | 10 |
| Comparative Example 2 | Absent | 55 | 500 | 3.2 | 60.0 | 26.7 | 85.0 | 80 |
| Comparative Example 3 | Absent | 155 | 130 | 3.2 | 18.0 | 2.0 | 70.0 | 65 |
| Comparative Example 4 | Absent | 52 | 48 | 3.2 | 22 | 12 | 75 | 60 |

The present disclosure provides a carbon-coated vanadium dioxide particle which may suppress interparticle sintering during high-temperature firing, may have high crystallinity and high oxidation resistance, and may maintain its thermochromic properties even after long-term storage or use. The carbon-coated vanadium dioxide particle obtained on the present disclosure may be used in, for example, a resin composition, a coating film, a film, an interlayer film for laminated glass, a laminated glass, and a film to be attached.

Although the disclosure has been described with respect to only a limited number of embodiments, those skilled in the art, having benefit of this disclosure, will appreciate that various other embodiments may be devised without departing from the scope of the present disclosure. Accordingly, the scope of the disclosure should be limited only by the attached claims.

The invention claimed is:
1. A carbon-coated vanadium dioxide particle, comprising:
   a vanadium dioxide particle; and
   a coating layer containing amorphous carbon on a surface of the vanadium dioxide particle,
   wherein the amorphous carbon is derived from carbon contained in an oxazine resin, and has a peak intensity ratio of a G band to a D band of 1.5 or greater as determined from a Raman spectrum, the coating layer has an average thickness of 50 nm or less, the coating layer has a coefficient of variation (CV value) of thickness of 7% or less, and at least one of a mass spectrum derived from a benzene ring and a mass spectrum derived from a naphthalene ring is detected when the coating layer is analyzed by time-of-flight secondary ion mass spectrometry (TOF-SIMS), and the average particle size of the carbon-coated vanadium dioxide particle is 45 to 130 nm.

2. The carbon-coated vanadium dioxide particle according to claim 1, wherein no peak is detected at a position where 2θ is 26.4° when the coating layer is analyzed by an X-ray diffraction method.

3. The carbon-coated vanadium dioxide particle according to claim 1, wherein the oxazine resin is a naphthoxazine resin.

4. The carbon-coated vanadium dioxide particle according to claim 1, wherein the vanadium dioxide particle has a structure represented by Formula (1):

$$V_{1-x}M_xO_2 \qquad (1),$$

wherein M is at least one element selected from the group consisting of tungsten, molybdenum, tantalum, niobium, chromium, iron, gallium, aluminum, fluorine, and phosphorus, and x is a value of 0 to 0.05.

5. A resin composition, comprising:
the carbon-coated vanadium dioxide particle according to claim 1; and
a thermosetting resin.

6. A coating film comprising the resin composition according to claim 5.

7. A film, comprising:
the carbon-coated vanadium dioxide particle according to claim 1; and
a thermoplastic resin.

8. A bondable film, comprising the film according to claim 7 and an adhesive layer.

9. An interlayer film for laminated glass, the interlayer film comprising the film according to claim 7.

10. A laminated glass, comprising:
two transparent plates; and
the interlayer film for laminated glass according to claim 9 interposed between the transparent plates.

11. The carbon-coated vanadium dioxide particle according to claim 2, wherein the oxazine resin is a naphthoxazine resin.

12. The carbon-coated vanadium dioxide particle according to claim 2, wherein the vanadium dioxide particle has a structure represented by Formula (1):

$$V_{1-x}M_xO_2 \qquad (1),$$

wherein M is at least one element selected from the group consisting of tungsten, molybdenum, tantalum, niobium, chromium, iron, gallium, aluminum, fluorine, and phosphorus, and x is a value of 0 to 0.05.

13. A resin composition, comprising:
the carbon-coated vanadium dioxide particle according to claim 2; and
a thermosetting resin.

14. The carbon-coated vanadium dioxide particle according to claim 3, wherein the vanadium dioxide particle has a structure represented by Formula (1):

$$V_{1-x}M_xO_2 \qquad (1),$$

wherein M is at least one element selected from the group consisting of tungsten, molybdenum, tantalum, niobium, chromium, iron, gallium, aluminum, fluorine, and phosphorus, and x is a value of 0 to 0.05.

15. A resin composition, comprising:
the carbon-coated vanadium dioxide particle according to claim 3; and
a thermosetting resin.

16. A resin composition, comprising:
the carbon-coated vanadium dioxide particle according to claim 4; and
a thermosetting resin.

* * * * *